United States Patent Office 2,814,221
Patented Nov. 26, 1957

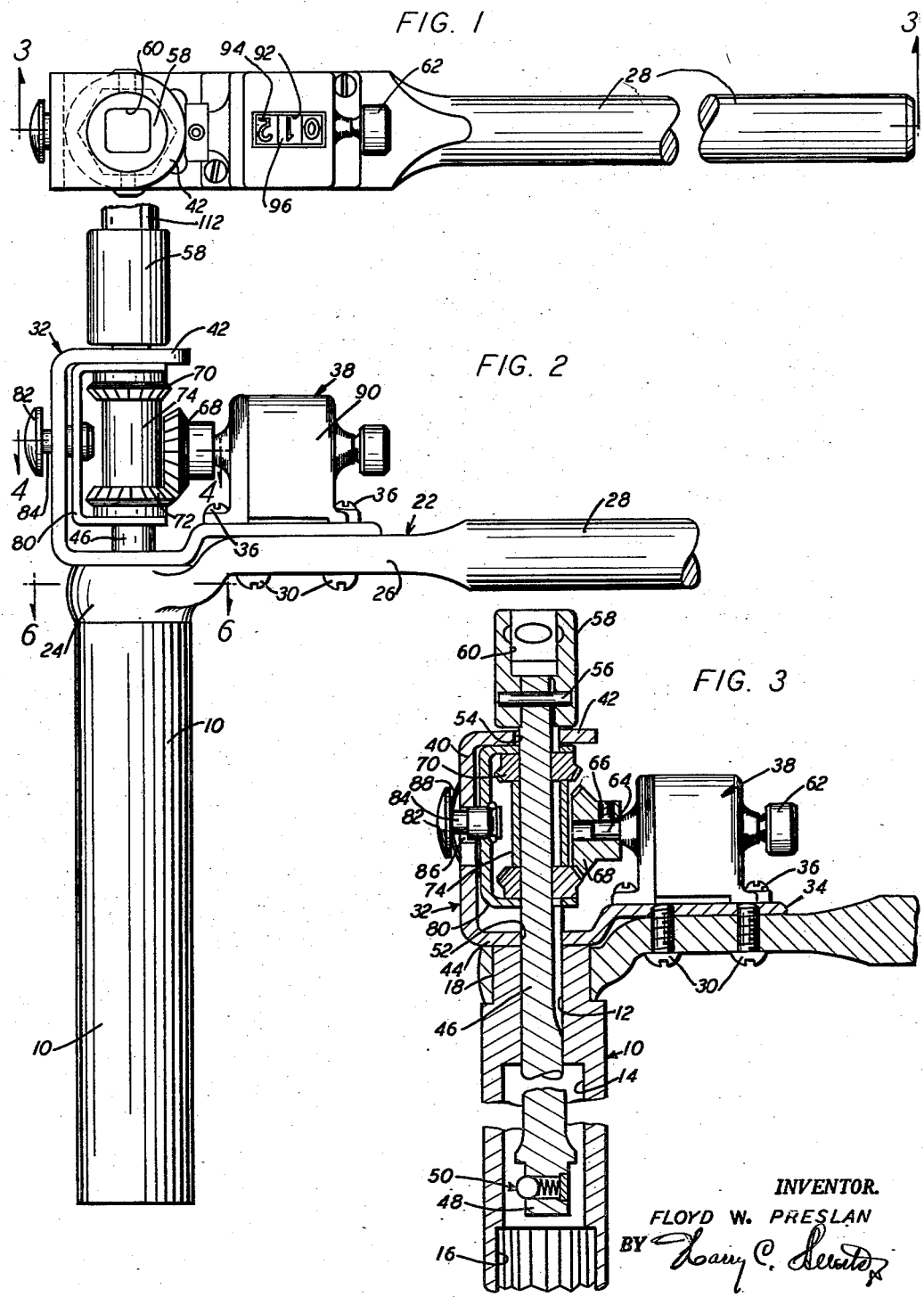

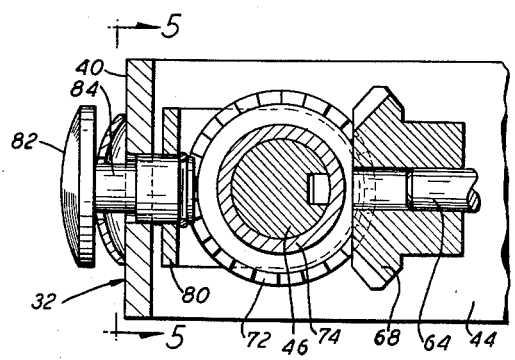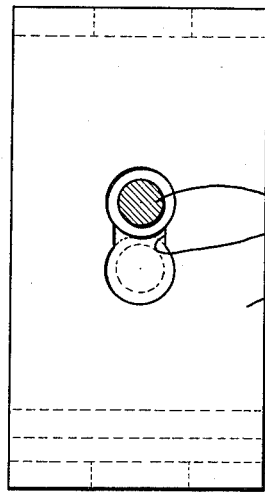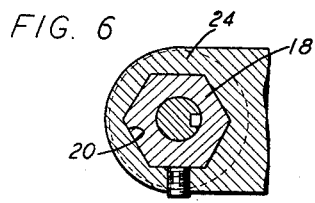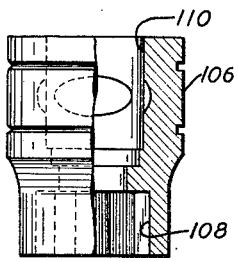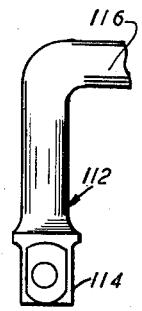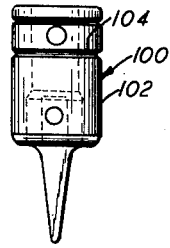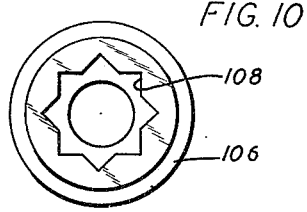

2,814,221

AUTOMATIC TRANSMISSION BAND ADJUSTING TOOL FOR INTERNAL COMBUSTION ENGINES

Floyd W. Preslan, Kenosha, Wis., assignor to Snap-On Tools Corporation, Kenosha, Wis., a corporation of Delaware Application June 22, 1955, Serial No. 517,144

6 Claims. (Cl. 81—3)

The present invention relates to adjusting tools for regulating the tension on transmission bands and particularly on the servo-operated bands employed in connection with present day automatic transmissions designed for automotive use, as for example, the Dynaflow, Hydra-matic, Power-glide and other automobile transmissions by means of which manual gearshift operations have been eliminated.

In order to properly adjust the various servo-operated bands of transmissions of the type briefly outlined above, a large number of individual tools have heretofore been provided, one for each of the various types of transmissions. The transmission mounted adjustments for transmissions of this type are invariably concealed within the transmission casing and usually consist of an adjusting screw together with an adjusting screw lock nut, both of which elements are accessible only through a small opening provided in the transmission casing or casing cover plate. Furthermore, these elements are disposed well within the casing confines and different types of transmissions employ different screw characteristics as for example square, hexagonal, or slotted screw heads. Still further, some of these adjusting screws require a clockwise adjustment while others require a counter clockwise adjustment so that tools having different types of turn counters are required for servicing the various types of transmissions.

The present invention is designed to overcome the above noted limitations that are attendant upon the servicing of a large variety of automatic transmissions, and toward this end it contemplates the provision of a transmission band adjusting tool which is more nearly universal in its application than have been any of the tools currently employed for this purpose.

The provision of a more or less universal transmission band adjusting tool which will accommodate the servicing of a large number of transmissions having different adjusting characteristics being among the general objects of the present invention, a more specific object is to provide such a tool which, by a simple manual adjustment may be converted for use in the adjusting of band screws which require for adjusting purposes turning movement in either a clockwise or counter clockwise direction. Another object of the invention is to provide a tool of this character which may be conveniently operated, during adjusting operations, first to loosen the band adjusting screw lock nut, to thereafter effect the necessary adjustment, and finally, to again tighten the band adjusting screw lock nut.

The provision of a band adjusting screw which is relatively simple in its construction; one which is comprised of a minimum number of moving parts and which therefore is unlikely to get out of order; one which is rugged and durable and which therefore is possessed of a relatively long and useful life; one which is capable of ease of assembly and disassembly for purposes of inspection, replacement or repair; one which is possessed of interchangeable parts to accommodate different styles of adjusting screws and lock nuts therefor; one which may easily be manipulated by a single operator, and one which otherwise is well adapted to perform the services required of it are further desirable features that have been borne in mind in the production and development of the present invention.

Other objects and advantages of the invention, not at this time enumerated, will become more readily apparent as the nature of the invention is better understood.

In the accompanying two sheets of drawings forming a part of this specification, a preferred embodiment of the invention has been shown.

In these drawings:

Fig. 1 is a top plan view of an automatic transmission band adjusting tool assembly constructed in accordance with the principles of the present invention.

Fig. 2 is a side elevational view of the structure shown in Fig. 1.

Fig. 3 is a fragmentary sectional view taken substantially along the line 3—3 of Fig. 1.

Fig. 4 is a fragmentary sectional view taken substantialaly along the line 4—4 of Fig. 2.

Fig. 5 is a sectional view taken substantially along the line 5—5 of Fig. 4.

Fig. 6 is a sectional view taken substantially along the line 6—6 of Fig. 2.

Fig. 7 is a fragmentary view of a portion of a torque applying instrumentality capable of being employed in connection with the present invention.

Fig. 8 is a side elevational view of an adaptor tool capable of use in connection with the present invention for effecting band adjustment on a particular type of transmission.

Fig. 9 is a side elevational view partly in section of another adaptor tool capable of being employed for effecting band adjustments on a different type of transmission, and Fig. 10 is a bottom plan view of the structure shown in Fig. 9.

The structure selected for illustration is not intended to serve as a limitation upon the scope or teachings of the invention, but is merely illustrative thereof. There may be considerable variations and adaptations of all or part of the teachings of the invention depending upon the dictates of commercial practice.

Referring now to the drawings in detail and in particular to Figs. 1 to 3 inclusive, the improved band adjusting tool comprising the present invention involves in its general organization a generally tubular elongated socket member 10 having a central bore 12 formed therein and a counterbore 14 the lower end of which is provided with a multi-sided socket proper 16 adapted to be telescopically received over the usual band adjusting screw lock nut associated with the particular automatic transmission undergoing servicing. The upper end of the tubular member 10 is formed with a reduced hexagonal portion 19 (see also Fig. 6) over which there is received a hexagonal opening 20 provided in a box-type wrench 22, the wrench having a head portion 24 through which the hexagonal opening 20 extends, a shank portion 26 and an operating handle portion 28. The shank portion 26 of the wrench 22 has secured thereto by means of clamping screws 30 a generally U-shaped frame member or bracket 32 having a lateral extension 34 formed thereon to which there is anchored by means of screws 36 a conventional counter assembly 38 which may be of the Veeder type, the purpose and function of which will be set forth presently. The bracket 32 includes a vertically extending base portion 40 and upper and lower horizontal leg portions 42 and 44, the extension 34 being a lateral offset continuation of this latter leg portion.

Rotatably mounted within the bore 12 of the socket member 10 is an elongated shaft 46 the lower end of which projects into the counterbore 14 and has formed thereon a squared end 48 designed for selective reception thereover of a plurality of different adaptor tools, as for example, the adaptor tools shown in Figs. 8 and 9 which will be described subsequently. The squared end 48 is provided with the usual ball detent mechanism 50 by means of which the adaptor tools are removably retained in position on the shaft 46.

The shaft 46 projects upwardly above the upper end of the socket member 10 and passes through openings 52 and 54 respectively provided in the lower and upper legs 42 and 44 respectively of the bracket 32. The extreme upper end of the shaft 46 has pinned thereto as at 56 a socket member 58 having a squared socket opening 60 therein designed for reception of one end of a torque applying tool as for example the tool illustrated in Fig. 7 and which will also subsequently be described.

The counter mechanism 38, as stated above, may be of conventional design and is adapted to indicate the number of turns made by the shaft 46 from an initial position of orientation representing a zero reading on the counter. The counter 38 is provided with an operating or setting knob 62 and a projecting driven shaft 64 which has secured thereto by a set screw 66 a bevel gear 68. The gear 68 is designed for selective meshing engagement with a pair of spaced bevel gears 70 and 72 respectively, slidably keyed upon the shaft 46 and maintained in their spaced relationship by means of a spacer sleeve 74 surrounding the shaft 46. The gears 70 and 72 are confined with a U-shaped cage 80 slidable along the shaft 46 and having associated therewith an operating button assembly 82 including a shaft 84 which projects through a slot 86 formed in the vertical base 40 of the bracket 32. A leaf spring 88 bears against the operating button and against the outer face of the bracket 32 and serves to retard the shifting movements of the cage 80 so that the same may be selectively brought to and maintained in a position wherein either the bevel gear 70 or the bevel gear 72 meshes with the bevel gear 68 carrier by the shaft 64 of the counter mechanism 38.

As shown in Fig. 1 the counter assembly 38 includes an outer casing 90 which encloses the Veeder or other counter mechanism and the upper face of the casing is provided with the usual window opening 92 through which the indicia 94 provided on the various counter wheels 96 are visible. The wheels 96 are, of course, rotatably mounted on the shaft 64 in the usual manner of mounting such wheels and the setting knob 62 may be employed to set the indicia 94 to their zero setting at the commencement of any particular band adjusting operation.

In the operation of the band adjusting tool of the present invention, various techniques must be employed for different types of transmissions undergoing treatment. Certain transmissions have band adjusting screws the heads of which are slotted and, when the tool is employed on such transmissions, the slotted adaptor tool designated in its entirety at 100 in Fig. 8 will be employed. This adaptor is in the form of a socket body 102 having a squared socket 104 formed in one end thereof designed for reception over the squared end 48 of the shaft 46 so that the socket becomes nested within the larger socket 16 which is telescopically received over the adjusting lock nut of the transmission. Other types of transmissions may have band adjusting screws of the male plug type which are either square, octagonal or otherwise are multi-sided. For such transmissions an adaptor tool or socket of the type shown in Fig. 9 at 106 may be employed. Such a socket device has a multi-sided socket 108 formed in one end thereof for reception over the band adjusting screw while the other end is formed with a square socket 110 for reception on the reduced lower end 48 of the shaft 46. It will be understood of course that additional types of adaptor socket members are contemplated for reception on the lower end of the shaft 46 and these interchangeable socket devices will be selected according to exigencies to accommodate the particular type of band adjusting screw involved.

In the adjustment of any particular transmission band as for example the front band of a hydra-matic transmission, the hand brake of the vehicle is set to prevent the car from running forward during adjustments. The accelerator pedal, floor mat and adjusting hole cover are removed. The engine is started and run until a normal temperature is reached. The control lever of the transmission is set to its drive position. The tubular socket member 10 of the present adjusting tool is then inserted through the adjusting hole and the socket portion 16 is telescoped over the band screw lock nut and the handle 28 is turned in a direction to loosen this lock nut. The torque applying device shown in Fig. 7 and designated in its entirety at 112 is provided with a square end 114 capable of being received in the socket 60 of the member 58. This torque device 112 is also provided with an operating handle 116. The device 112 is manipulated so as to loosen the band adjusting screw and this screw may be maintained loose until a predetermined engine speed, for example 1,000 R. P. M., of engine speed is attained. The tool 112 may then further be manipulated to decrease engine speed to 700 R. P. M. by tightening the adjusting screw. If the engine speed remains at 700 R. P. M. and does not increase for approximately thirty seconds, the counter device 38 is then set to its zero reading. While holding the lock nut stationary by means of the handle 28, the shaft 46 may then be turned a predetermined number of turns as for example 5½ turns so that the indicia 94 will read 5.5. The handle 116 of the tool 112 is held stationary so as to prevent turning of the shaft 46 and the handle 28 is manipulated to turn the socket member 10 in a direction to tighten the lock nut and this completes the adjusting operations. It will of course be understood that if the band is to be tightened by a turning movement of the shaft 46 in a clockwise direction, the gear shifting button 82 will be set to one extreme position, for example the position indicated in Fig. 3, wherein the gears 72 and 68 are in mesh. However, if the band adjusting screw is to be tightened by turning in the opposite direction the button 82 will be manipulated to bring the gears 70 and 68 into mesh.

The above description of a particular type of transmission is purely exemplary and it will be understood of course that for other types of transmissions the procedures recommended by the manufacture may be resorted to and these procedures may involve a different direction of turning of the shaft 46 or a different number of adjustment turns therefor. Thus, while there has been illustrated and described a preferred embodiment of the invention, it must be understood that the invention is capable of considerable modification without departing from the spirit of the invention. The invention therefore is not to be limited to the precise details of construction set forth and such variations and modifications as come within the scope of the appended claims may be taken advantage of if desired.

What is claimed is:

1. In a band adjusting device for automatic transmissions having a band adjusting screw and a lock nut therefor, in combination, an elongated tubular socket member having a socket formed at the lower end thereof for reception over said lock nut, an operating handle extending laterally from the upper end of said socket member, an operating shaft telescopically received within said socket member and projecting upwardly above the upper end of said socket member, an operating handle projecting laterally from the upper end of said operating shaft, said operating shaft being rotatable within the socket member and projecting downwardly within the latter to a point adjacent the socket provided within the same, means removably mounted on the lower end of said operating shaft for cooperation with said band adjusting screw when the socket member is positioned over said lock nut, a rotation counter for said operating shaft mounted on said first mentioned handle, a driven shaft for said counter, and selective means operatively connecting said operating shaft and driven shaft in driving relationship.

2. In a band adjusting device for automatic transmissions having a band adjusting screw and a lock nut therefor, in combination, an elongated tubular socket member having a socket formed at the lower end thereof for reception over said lock nut, an operating handle extending laterally from the upper end of said socket member, an operating shaft for said band adjusting screw telescopically received within said socket member and projecting upwardly laterally from the upper end of said operating shaft, said operating shaft being rotatable within said socket member and projecting downwardly within the latter to a point adjacent the socket provided within the same, means carried at the lower end of said operating shaft for turning cooperation with said band adjusting screw when the socket member is positioned over said lock nut, a rotation counter for said operating shaft mounted on said first mentioned handle, a driven shaft for said counter, and means for selectively connecting said operating shaft and counter driven shaft in driving relationship.

3. In a band adjusting device for automatic transmissions having a band adjusting screw and a lock nut therefor, in combination, an elongated tubular socket member having a socket formed at the lower end thereof for reception over said lock nut, an operating handle extending laterally from the upper end of said socket member, an operating shaft for said band adjusting screw telescopically received within said socket member and projecting upwardly above the upper end of the latter, an operating handle projecting laterally from the upper end of said operating shaft, said operating shaft being rotatable within said socket member and projecting downwardly within the latter to a point adjacent the socket provided within the same, means carried at the lower end of said operating shaft for turning cooperation with said band adjusting screw when the socket member is positioned over said lock nut, a rotation counter for said operating shaft and having a driven shaft, and means selectively connecting said operating shaft and driven shaft for translating unidirectional movement of the former to the latter in opposite directions.

4. In a band adjusting device, the combination set forth in claim 3 wherein said means carried at the lower end of the operating shaft comprises a squared end portion on the shaft adapted to detachably receive different adaptor elements for turning registry with different forms of band adjusting screws.

5. In a band adjusting device for automatic transmissions having a band adjusting screw and a lock nut therefor, in combination, an elongated tubular socket member having a socket formed at the lower end thereof for reception over said lock nut, an operating handle extending laterally from the upper end of said socket member, an operating shaft for said band adjusting screw telescopically received within said socket member and projecting upwardly above the upper end of the latter, an operating handle projecting laterally from the upper end of said operating shaft, said operating shaft being rotatable within said socket member and projecting downwardly within the latter to a point adjacent the socket provided within the same, means carried at the lower end of said operating shaft for turning cooperation with said band adjusting screw, a rotation counter for said operating shaft including a driven shaft, a gear on said driven shaft, a gear cage slidable axially along said operating shaft, a pair of opposed spaced gears rotatably mounted on said cage and slidably keyed to said operating shaft, and means for shifting the position of said cage to selectively bring said opposed gears into selective meshing engagement with said gear on the counter driven shaft.

6. In a band adjusting device, the combination set forth in claim 5 wherein all of said gears are of the bevel gear type.

References Cited in the file of this patent
UNITED STATES PATENTS

| 1,451,281 | Sundh | Apr. 10, 1923 |
| 1,973,940 | Allen | Sept. 18, 1934 |
| 2,666,350 | Hackett | Jan. 19, 1954 |